Dec. 10, 1957   I. F. ANDERSON ET AL   2,816,148
PRODUCTION OF SUBSTANTIALLY PURE VINYL CHLORIDE
Filed April 27, 1955
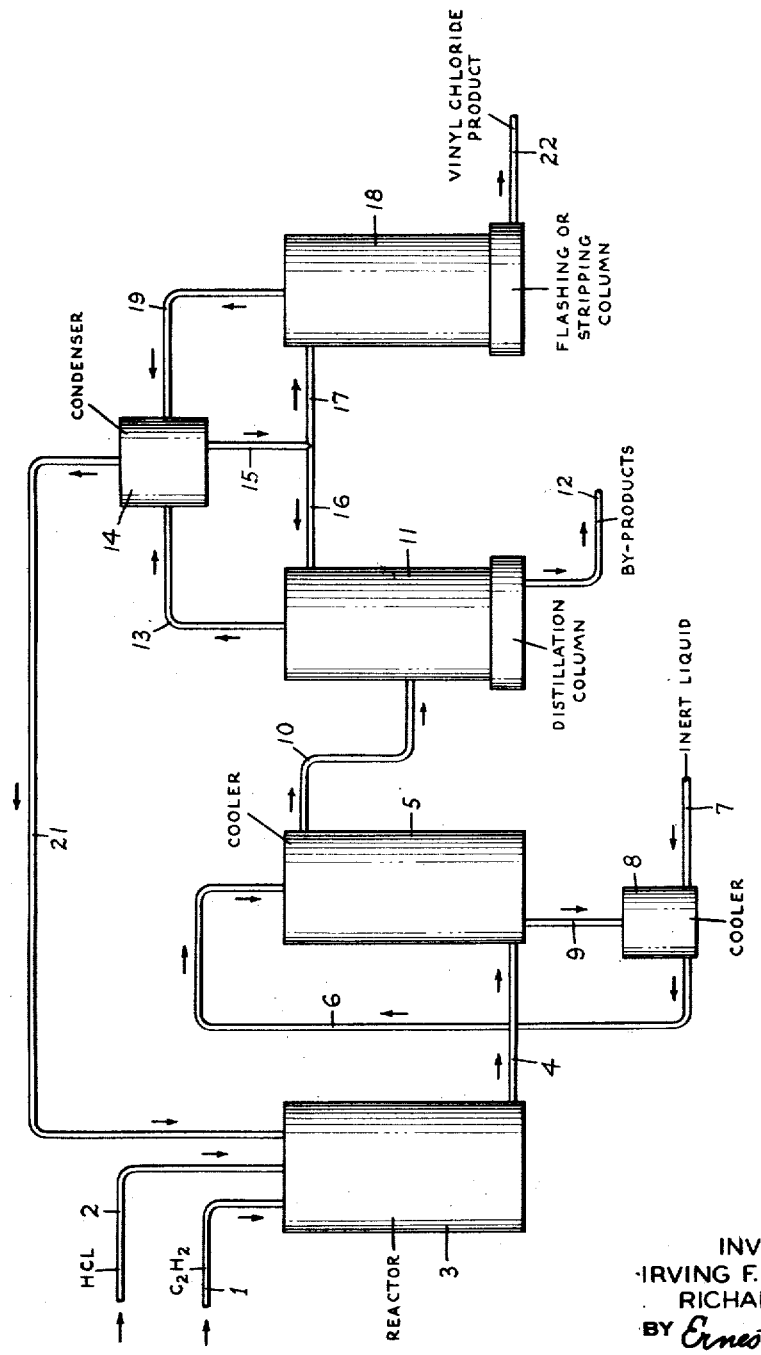
INVENTORS
IRVING F. ANDERSON
RICHARD C. DATIN
BY Ernest A. Polin
ATTORNEY

United States Patent Office 2,816,148
Patented Dec. 10, 1957

2,816,148

PRODUCTION OF SUBSTANTIALLY PURE VINYL CHLORIDE

Irving F. Anderson, Hopewell, and Richard C. Datin, Petersburg, Va., assignors to Allied Chemical & Dye Corporation, New York, N. Y., a corporation of New York Application April 27, 1955, Serial No. 504,134

8 Claims. (Cl. 260—656)

This invention relates to the production of substantially pure vinyl chloride and more particularly concerns an improved procedure for the recovery and purification of vinyl chloride.

Various methods of vinyl chloride recovery and purification have been described in the literature. In one method, the reactor effluent is subjected to water scrubbing to remove hydrogen chloride as the acid, caustic scrubbing, drying with caustic potash, precooling, distilling to remove high boiling materal and then degassing to remove inert gases including unreacted acetylene. Another process involves absorption of reactor effluent in cold trichloroethylene, three distillations, then scrubbing with aqueous sodium hydroxide, followed by drying with calcium chloride and final distillation. According to still another process, the reactor effluent is cooled indirectly with water and distilled in two steps. First, unreacted acetylene and hydrogen chloride are separated from crude liquid vinyl chloride collected at the base of the column. The crude material is then distilled in a second column to remove high boiling impurities, liquid vinyl chloride being the distillate. The distillate is then further purified by a scrubbing operation. All of these processes are complicated and costly both in capital and operating expense. Among their major disadvantages are high refrigeration and heating requirements and/or introduction of water into the gas stream.

An object of the present invention is to provide a new and improved process for the production of substantially pure vinyl chloride. Another object is to provide a simple and economical procedure for the recovery and purification of vinyl chloride. Further objects and advantages of the present invention will appear hereinafter.

According to the present invention, a crude vinyl chloride anhydrous gaseous stream produced by catalytic reaction of acetylene and hydrogen chloride and containing by-product compounds higher boiling than vinyl chloride, such as acetaldehyde, as well as unreacted acetylene and hydrogen chloride, is cooled to temperature above condensation temperature of the stream by direct contact with an inert, anhydrous liquid, non-volatile at the contact temperature. By inert liquid is meant a liquid which at the conditions of contact does not react with the contents of the gaseous stream nor have substantial absorptive capacity for vinyl chloride. Cooling in the presence of the insert liquid produces an anhydrous gaseous stream comprising vinyl chloride and the by-product and unreacted compounds. This stream is subjected to distillation under reflux of vinyl chloride to produce a vaporous overhead comprising vinyl chloride, unreacted acetylene and hydrogen chloride and bottoms containing the higher boiling by-products of the catalytic step. The overhead product is then liquefied, and the liquid material is subjected to a flashing step to remove as overhead the lower boiling unreacted charge material. The bottoms from the flashing step comprise substantially pure vinyl chloride.

As a modification of the process of the invention, the distillation step may be conducted, for purposes of further economy, with a relatively limited reflux to produce as overhead a vaporous stream which contains some of the acetaldehyde by-product formed in the catalytic step. In this event, the bottoms from the flashing operation may be treated with aqueous alkali bisulfite solution to remove acetaldehyde therefrom.

Our invention can more readily be understood by reference to the attached drawing which is described in detail below. Such conventional equipment as pumps, valves, etc., has not been included in the drawing in order to facilitate an understanding of our invention, but it is to be understood that such equipment may be used in practice of our invention.

Acetylene and hydrogen chloride, in dry form, are introduced through lines 1 and 2, respectively, into a reactor 3 where they contact a suitable solid catalyst material at conditions more fully described below. An exothermic reaction occurs, and a hot anhydrous gaseous stream comprising principally vinyl chloride is produced. The gaseous stream also contains by-product compounds higher boiling than vinyl chloride, mainly ethylidene chloride and acetaldehyde, as well as unreacted acetylene and hydrogen chloride.

The mol ratio of acetylene and hydrogen chloride may vary from about 0.3 to 3:1, but a mol ratio of about 1:1 is preferred. When a fresh catalyst is employed, it has been found desirable to subject the catalyst to a period of about 50 to 150 hours during which time local hot spots are avoided by using a molar excess of either reactant. As the catalyst is tempered, the feed rate of reactants may be adjusted to the preferred 1:1 mol ratio.

The catalyst suitably comprises activated carbon impregnated with mercuric chloride. Excellent results have been achieved when the activated carbon contains about 9 to 11 weight percent of mercuric chloride.

High rate of production per unit of catalyst, and accordingly, reduced requirements for reactor size, is maintained by operating at high space velocity (volume of reactants at S. T. P. per hours per volume of catalyst). The space velocity may vary from about 150 to 1000, the preferred range being from about 300 to 500.

The life of the catalyst may be prolonged through careful temperature control, by efficient removal of the heat of reaction and by addition of mercuric chloride to the reactor during operation.

The catalyst temperature may range from about 100° to 250° C., preferably from about 110° to 210° C., during the entire reaction. However, the actual temperatures employed will depend on many factors, for example, on the space velocity of the reactant gases, the length of the reactor and catalyst bed, the concentration of the reactant gases and the catalyst employed. Control of catalyst temperature at the high space velocities of the present invention may be facilitated by packing the catalyst in a multiplicity of small-diameter tubes cooled on the outside by a suitable heat-transfer medium such as water, tetralin or Dowtherm (a eutectic mixture of diphenyl and diphenyl oxide).

With respect to addition of mercuric chloride to the reactor during operation, this may vary from about 0.0025 to 0.02 pound, and preferably from about 0.0035 to 0.015 pound, per hour per cubic foot of catalyst. Continuous addition of mercuric chloride to the catalyst is particularly effective in prolonging catalyst activity, since operation can then be conducted at lower temperatures, as in the order of about 110° to 150° C. This results in reduced loss of mercuric chloride by sublimation and decreased rate of catalyst de-activation, apparently caused by plugging of the carrier pores with polymer. The mercuric chloride can be added during operation either by volatilization into part or all of the incoming gases or as a solution, for example, dissolved in acetone. Typical operation consists of continuous or periodic injection of mercuric chloride or its solution at a rate sufficient to obtain the desired conversion at as low a temperature level for the catalyst as is practical. As the catalyst ages, the temperature level must be increased to maintain conversion until further increase is without significant benefit. The catalyst is then considered spent, and further use is uneconomical.

The pressure in the catalyst zone may vary from about 0 to 30 pounds per square inch gauge, but preferably is about 5 to 15 pounds per square inch gauge.

The anhydrous gaseous stream exiting reactor 3 at a temperature of about 100° to 250° C. is passed through line 4 to a cooler 5 which is a packed column, bubble plate tower or other suitable apparatus adapted to provide efficient gas-to-liquid contact. In cooler 5 the gaseous stream is countercurrently contacted with a suitable inert, non-volatile liquid introduced to cooler 5 through line 6. Suitable inert liquids must be anhydrous, preferably boil above about 150° C., and must be unreactive under the conditions of contact with the contents of the gaseous stream and substantially non-absorbent toward vinyl chloride, and preferably, also toward all components of the gaseous stream. Among such liquids are kerosene, tetrachloroethane, decalin, chlorinated diphenyl and diphenyl. The inert liquid before being passed through cooler 5 is introduced through line 7 to a cooler 8, where it is cooled, for example, by indirect contact with water, to a temperature of about 20° to 40° C., preferably about 25° to 35° C. The inert liquid is passed through cooler 5 at sufficient rate, considering its temperature and that of the gaseous stream, to cool the gaseous stream to a temperature of about 25° to 45° C., preferably about 30° to 40° C. After passing the inert liquid through cooler 5, it is withdrawn through line 9 and is then passed through cooler 7 for recirculation to cooler 5. The cooled anhydrous gaseous stream comprises vinyl chloride and substantially all of the by-product and unreacted compounds of the reactor effluent. The anhydrous gaseous stream is passed through line 10 to a distillation column 11, maintained preferably at about 0 to 30 pounds per square inch gauge. Column 11 may be any conventional distillation column provided, for example, with a stillpot and containing filler bodies, bell plates, sieve plates or the like. The stillpot or column bottom is maintained at a temperature of about 10° to 80° C., and the column is refluxed with liquid vinyl chloride, for example, in reflux mol ratio of about 0.25 to 0.75:1 with reference to column overhead. High-boiling impurities, principally ethylidene chloride and acetaldehyde, are removed as bottoms from column 11 through line 12. The vaporous overhead having a vapor temperature of about −15° to +20° C. and comprising vinyl chloride and unreacted hydrogen chloride and acetylene passes from the top of column 11 through line 13 to a suitably refrigerated condenser 14, maintained at about −15° to −30° C., where liquid vinyl chloride is formed. Part of the liquid vinyl chloride may be passed through lines 15 and 16 to the top portion of column 11 to establish the desired reflux in the column. The remaining liquid vinyl chloride is passed through lines 15 and 17 to a flashing or stripping column 18, preferably maintained at about 0 to 30 pounds per square inch gauge. This column may be provided with a stillpot and contain filler bodies, belt plates, sieve plates or the like. The stillpot is maintained at a temperature of about −10° to +20° C. The overhead of column 18 with a vapor temperature of about −15° to +15° C. comprises unreacted acetylene and hydrogen chloride gases, including a small amount of uncondensed vinyl chloride. The overhead material passes through line 19 back to condenser 14. If desired, the uncondensed gases from condenser 14 may be recycled through line 21 to reactor 3. The bottoms of column 18 comprise substantially pure (about 99.5 to 99.9%) vinyl chloride product which may be removed through line 22.

If desired, distillation in column 11 may be conducted with a relatively limited reflux, e. g., liquid vinyl chloride formed in condenser 14 may be returned to the top portion of the column in mol ratio of about 0.1 to 0.2:1 with reference to column overhead. In such case, an overhead is produced which contains some of the acetaldehyde present in the reactor effluent. Removal of such acetaldehyde may be effected by treating the vinyl chloride fraction with aqueous bisulfite solution in a suitable column (not shown) at a temperature of about 5° to 30° C. The pressure in such column must be higher than the combined vapor pressure of water and vinyl chloride at the operating temperature, and suitable pressures range from about 15 to 100 pounds per square inch gauge. Concentration of bisulfite, which is suitably sodium bisulfite, in the treating solution can be any value up to the limit of solubility, preferred range being about 5 to 20 weight percent. Any sulfur dioxide absorbed by the vinyl chloride phase may be removed in a separate column (not shown) which is filled with about 10 to 20 weight percent aqueous caustic solution. Besides producing a product free of acetaldehyde, the bisulfite-caustic treatment enables reduction of size and operating cost of the distillation column.

The following examples illustrate the invention but are not to be construed as limiting the same.

*Example 1.*—Acetylene and hydrogen chloride, in dry form, are introduced into reactor 3 comprising a steel tube provided with a water jacket. The tube is packed with 4–6 mesh activated carbon extruded pellets impregnated with 11 weight percent mercuric chloride. The following operating conditions are maintained:

Mol ratio of acetylene to hydrogen chloride _____ About 1:1.
Space velocity _____ About 300.
Catalyst temperature _____ About 110° to 185° C.
Pressure _____ About 7.5 pounds per square inch gauge.

During operation mercuric chloride is added to the reactor through a suitable vaporizer at rate sufficient to maintain constant conversion without raising the catalyst temperature. This rate varies from about 0.005 to 0.01 pound of mercuric chloride per hour per cubic foot of catalyst. Under these conditions, conversion of acetylene to vinyl chloride is about 81%.

The crude vinyl chloride vapors exiting reactor 3 at a temperature of about 150° C. are passed to cooler 5 where they are countercurrently contacted with anhydrous Aroclor 1242 (chlorinated diphenyl) having a temperature of about 30° C., at the rate of about 150 gallons of Aroclor 1242 for each 1000 cubic feet of reactor effluent. The vinyl chloride gaseous product exiting cooler 5 at a temperature of about 35° C. is passed to 9 plate column 11 and subjected to distillation under reflux of vinyl chloride. High-boiling impurities, mainly ethylidene chloride and acetaldehyde, are removed from the bottom of column 11. The overhead vapors are condensed to liquid vinyl chloride in condenser 14 and part returned to the top portion of column 11 in mol ratio of about 0.5 to 1 with reference to column overhead. The net liquid vinyl chloride is passed to column 18 where a flashing or stripping operation takes place. The overhead of column 18 having a vapor temperature of about −5° C. comprises principally unreacted acetylene and hydrogen chloride gases. The bottoms of column 18 comprise substantially pure (99.9%) vinyl chloride product.

*Example 2.*—Acetylene and hydrogen chloride, in anhydrous form, are introduced into reactor 3 which is packed with 4–6 mesh activated carbon extruded pellets impregnated with 10 weight percent mercuric chloride. The following operating conditions are maintained:

| | |
|---|---|
| Mol ratio of acetylene to hydrogen chloride | About 1:1. |
| Space velocity | About 300. |
| Catalyst temperature | About 110° to 165° C. |
| Pressure | About 7.5 pounds per square inch gauge. |

During operation mercuric chloride is added to the reactor through a suitable vaporizer at a rate varying from about 0.005 to 0.01 pound of mercuric chloride per hour per cubic foot of catalyst. Under these conditions, conversion of acetylene to vinyl chloride is about 80%.

The crude vinyl chloride vapors exiting reactor 3 at a temperature of about 130° C. are passed to cooler 5 where they are countercurrently contacted with anhydrous decalin having a temperature of about 35° C., at the rate of about 150 gallons of decalin for each 1000 cubic feet of reactor effluent. The vinyl chloride gaseous product exiting cooler 5 at temperature of about 40° C. is passed to 9 plate column 11 and subjected to distillation under reflux of vinyl chloride. High-boiling impurities, mainly ethylidene chloride and acetaldehyde, are removed from the bottom of column 11. The overhead vapors are condensed to liquid vinyl chloride in condenser 14 and part returned to the top portion of column 11 in mol ratio of about 0.2 to 1 with reference to column overhead. The net liquid vinyl chloride containing unreacted acetylene and hydrogen chloride and some acetaldehyde is passed to column 18 where a flashing or stripping operation takes place. The overhead of column 18 having a vapor temperature of about −5° C. comprises principally unreacted acetylene and hydrogen chloride gases. The bottoms of column 18 comprise (99.8%) vinyl chloride product containing acetaldehyde. The vinyl chloride product is then passed through a column containing 10% aqueous sodium bisulfite and then through a column containing 15% aqueous sodium hydroxide to effect removal of the acetaldehyde.

The present recovery and purification procedure provides many advantages over prior art methods. Generally speaking, it requires fewer operations involving less equipment, and hence, results in greater efficiency as well as in substantial savings. These advantages flow in part from each of the following characteristics of preferred practice: efficient heat exchange, condensation of reactor effluent but once, and avoidance of water in the system.

The foregoing description of our invention is not to be taken as limiting our invention, but only as illustrative thereof since many variations may be made by those skilled in the art without departing from the scope of the following claims. For example, it will be obvious to those skilled in the art that the present invention may be carried out in either continuous or batchwise manner.

We claim:

1. A process for the recovery and purification of a hot crude vinyl chloride anhydrous gaseous stream produced by catalytic reaction of acetylene and hydrogen chloride as sole reactants and containing by-product compounds higher boiling than vinyl chloride, as well as unreacted acetylene and hydrogen chloride, which comprises cooling said anhydrous gaseous stream to temperature above the condensation temperature of said stream by direct contact with an inert, anhydrous, non-volatile liquid to produce an anhydrous gaseous stream comprising vinyl chloride and substantially all of the by-product and unreacted compounds, subjecting said cooled anhydrous gaseous stream to distillation under reflux of vinyl chloride to produce a vaporous overhead comprising vinyl chloride and unreacted acetylene and hydrogen chloride and bottoms containing substantially all of the by-product compounds, liquefying said vaporous overhead and subjecting the liquid material to a flashing step to remove as overhead unreacted acetylene and hydrogen chloride gases and as bottoms substantially pure vinyl chloride.

2. A process for the recovery and purification of a crude vinyl chloride anhydrous gaseous stream produced by catalytic reaction of acetylene and hydrogen chloride as sole reactants and containing by-product compounds higher boiling than vinyl chloride, as well as unreacted acetylene and hydrogen chloride, which comprises cooling said anhydrous gaseous stream by direct contact with an anhydrous liquid of the group consisting of kerosene, tetrachloroethane, decalin, diphenyl and chlorinated diphenyl to produce an anhydrous gaseous stream comprising vinyl chloride and substantially all of the by-product and unreacted compounds, subjecting said cooled anhydrous gaseous stream to distillation under reflux of vinyl chloride to produce a vaporous overhead comprising vinyl chloride and unreacted acetylene and hydrogen chloride and bottoms containing substantially all of the by-product compounds, liquefying said vaporous overhead and subjecting the liquid material to a flashing step to remove as overhead unreacted acetylene and hydrogen chloride gases and as bottoms substantially pure vinyl chloride.

3. A process for the recovery and purification of a crude vinyl chloride anhydrous gaseous stream produced by catalytic reaction of acetylene and hydrogen chloride as sole reactants and containing by-product compounds higher boiling than vinyl chloride, as well as unreacted acetylene and hydrogen chloride, which comprises cooling said anhydrous gaseous stream by direct contact with anhydrous chlorinated diphenyl to produce an anhydrous gaseous stream comprising vinyl chloride and substantially all of the by-product and unreacted compounds, subjecting said cooled anhydrous gaseous stream to distillation under reflux of vinyl chloride to produce a vaporous overhead comprising vinyl chloride and unreacted acetylene and hydrogen chloride and bottoms containing substantially all of the by-product compounds, liquefying said vaporous overhead and subjecting the liquid material to a flashing step to remove as overhead unreacted acetylene and hydrogen chloride gases and as bottoms substantially pure vinyl chloride.

4. A process for the recovery and purification of a crude vinyl chloride anhydrous gaseous stream produced by catalytic reaction of acetylene and hydrogen chloride as sole reactants and containing by-product compounds higher boiling than vinyl chloride, as well as unreacted acetylene and hydrogen chloride, which comprises cooling said anhydrous gaseous stream to a temperature of about 25° to 45° C. by direct contact with an anhydrous liquid of the group consisting of kerosene, tetrachloroethane, decalin, diphenyl and chlorinated diphenyl to produce an anhydrous gaseous stream comprising vinyl chloride and substantially all of the by-product and unreacted compounds, recovering said anhydrous liquid, cooling the recovered liquid and using it to cool additional crude vinyl chloride anhydrous gaseous stream, subjecting said cooled anhydrous gaseous stream to distillation under reflux of vinyl chloride to produce a vaporous overhead comprising vinyl chloride and unreacted acetylene and hydrogen chloride and bottoms containing substantially all of the by-product compounds, liquefying said vaporous overhead and subjecting the liquid material to a flashing step to remove as overhead unreacted acetylene and hydrogen chloride gases and as bottoms substantially pure vinyl chloride.

5. A process for the recovery and purification of a crude vinyl chloride anhydrous gaseous stream produced by catalytic reaction of acetylene and hydrogen chloride as sole reactants and containing by-product compounds higher boiling than vinyl chloride, as well as unreacted acetylene and hydrogen chloride, which comprises cooling said anhydrous gaseous stream to a temperature of about 25° to 45° C. by direct contact with anhydrous chlorinated diphenyl to produce an anhydrous gaseous stream comprising vinyl chloride and substantially all of the by-product and unreacted compounds, subjecting said cooled anhydrous gaseous stream to distillation under reflux of vinyl chloride to produce a vaporous overhead comprising vinyl chloride and unreacted acetylene and hydrogen chloride and bottoms containing substantially all of the by-product compounds, liquefying said vaporous overhead and subjecting the liquid material to a flashing step to remove as overhead unreacted acetylene and hydrogen chloride gases and as bottoms substantially pure vinyl chloride.

6. A process for the recovery and purification of a crude vinyl chloride anhydrous gaseous stream produced by catalytic reaction of acetylene and hydrogen chloride as sole reactants and containing by-product compounds higher boiling than vinyl chloride including acetaldehyde, as well as unreacted acetylene and hydrogen chloride, which comprises cooling said anhydrous gaseous stream by direct contact with an inert, anhydrous, non-volatile liquid to produce an anhydrous gaseous stream comprising vinyl chloride and substantially all of the by-product and unreacted compounds, subjecting said cooled anhydrous gaseous stream to distillation under reflux of vinyl chloride controlled to produce bottoms containing the bulk of the by-product compounds and a vaporous overhead comprising vinyl chloride, unreacted acetylene and hydrogen chloride and part of the acetaldehyde by-product, liquefying said vaporous overhead, subjecting the liquid material to a flashing step to remove as overhead unreacted acetylene and hydrogen chloride gases and bottoms composed essentially of vinyl chloride and acetaldehyde and treating said bottoms with an aqueous bisulfite solution to remove acetaldehyde therefrom.

7. A process for the recovery and purification of a crude vinyl chloride anhydrous gaseous stream produced by catalytic reaction of acetylene and hydrogen chloride as sole reactants and containing by-product compounds higher boiling than vinyl chloride, as well as unreacted acetylene and hydrogen chloride, which comprises cooling said anhydrous gaseous stream to a temperature of about 30° to 40° C. by direct contact with an anhydrous liquid of the group consisting of kerosene, tetrachloroethane, decalin, diphenyl and chlorinated diphenyl to produce an anhydrous gaseous stream comprising vinyl chloride and substantially all of the by-product and unreacted compounds, recovering said anhydrous liquid, cooling the recovered liquid and using it to cool additional crude vinyl chloride anhydrous gaseous stream, subjecting said cooled anhydrous gaseous stream to distillation in a column under reflux of vinyl chloride to produce a vaporous overhead comprising vinyl chloride and unreacted acetylene and hydrogen chloride and bottoms containing substantially all of the by-product compounds, liquefying said vaporous overhead, recycling a portion of said liquid material to the top portion of the distillation column as reflux and subjecting the remaining liquid material to a flashing step in a second column to remove as overhead unreacted acetylene and hydrogen chloride gases and as bottoms substantially pure vinyl chloride.

8. A process for the recovery and purification of a crude vinyl chloride anhydrous gaseous stream produced by catalytic reaction of acetylene and hydrogen chloride as sole reactants and containing by-product compounds higher boiling than vinyl chloride including acetaldehyde, as well as unreacted acetylene and hydrogen chloride, which comprises cooling said anhydrous gaseous stream to a temperature of about 30° to 40° C. by direct contact with an anhydrous liquid consisting of kerosene, tetrachloroethane, decalin, diphenyl and chlorinated diphenyl to produce an anhydrous gaseous stream comprising vinyl chloride and substantially all of the by-product and unreacted compounds, subjecting said cooled anhydrous gaseous stream to distillation in a column under reflux of vinyl chloride controlled to produce bottoms containing the bulk of the by-product compounds and a vaporous overhead comprising vinyl chloride, unreacted acetylene and hydrogen chloride and part of the acetaldehyde by-product, liquefying said vaporous overhead, recycling a portion of said liquid material to the top portion of the distillation column as reflux, subjecting the remaining liquid material to a flashing step in a second column to remove as overhead unreacted acetylene and hydrogen chloride gases and bottoms composed essentially of vinyl chloride and acetaldehyde and treating said bottoms with an aqueous bisulfite solution to remove acetaldehyde therefrom.

References Cited in the file of this patent

UNITED STATES PATENTS 2,480,021    Hillyer _____ Aug. 23, 1949

UNITED STATES PATENT OFFICE
CERTIFICATE OF CORRECTION

Patent No. 2,816,148                                                  December 10, 1957

Irving F. Anderson et al.

It is hereby certified that error appears in the printed specification of the above numbered patent requiring correction and that the said Letters Patent should read as corrected below.

Column 1, line 61, for "insert" read -- inert --; column 2, line 41, for "hours" read -- hour --; column 4, lines 37 to 41, Example 1, should appear as shown below instead of as in the patent:

```
Mol ratio of acetylene to
     hydrogen chloride -------- About 1:1.
Space velocity ----------------- About 300.
Catalyst temperature ---------- About 110° to 185° C.
Pressure ----------------------- About 7.5 pounds per
                                   square inch gauge.
```

Column 5, lines 3 to 7, Example 2, should appear as shown below instead of as in the patent:

```
Mol ratio of acetylene to
     hydrogen chloride -------- About 1:1.
Space velocity ----------------- About 300.
Catalyst temperature ---------- About 110° to 165° C.
Pressure ----------------------- About 7.5 pounds per
                                   square inch gauge.
```

Signed and sealed this 8th day of April 1958.

(SEAL)
Attest:

KARL H. AXLINE
Attesting Officer

ROBERT C. WATSON
                                                   Commissioner of Patents